(12) United States Patent
Dickson et al.

(10) Patent No.: US 10,496,439 B1
(45) Date of Patent: Dec. 3, 2019

(54) FINITE RESOURCE ALLOCATOR WITH INTRINSICALLY SUBORDINATE OPERATING SYSTEM

(71) Applicant: Space Sciences Corporation, Lemitar, NM (US)

(72) Inventors: Lawrence J. Dickson, National City, CA (US); Robert M. Fryer, Solana Beach, CA (US); Lindsay O. Quarrie, Socorro, NM (US)

(73) Assignee: Space Sciences Corporation, Lemitar, NM (US)

( * ) Notice: Subject to any disclaimer, the term of this patent is extended or adjusted under 35 U.S.C. 154(b) by 120 days.

(21) Appl. No.: 15/795,137

(22) Filed: Oct. 26, 2017

Related U.S. Application Data

(60) Provisional application No. 62/487,296, filed on Apr. 19, 2017, provisional application No. 62/434,892, filed on Dec. 15, 2016.

(51) Int. Cl.
*G06F 9/50* (2006.01)
*G06F 9/455* (2018.01)
(Continued)

(52) U.S. Cl.
CPC ............ *G06F 9/50* (2013.01); *G06F 9/455* (2013.01); *G06F 9/45533* (2013.01);
(Continued)

(58) Field of Classification Search
CPC .. G06F 9/455; G06F 9/45533; G06F 9/45541; G06F 9/45558;
(Continued)

(56) References Cited

U.S. PATENT DOCUMENTS

| 5,887,191 A | 3/1999 | Adiga et al. |
| 5,946,466 A | 8/1999 | Adiga et al. |

(Continued)

OTHER PUBLICATIONS

De Galas, "Hardware Virtualization: the Nuts and Bolts", AnandTech, Mar. 17, 2008. http://www.anandtech.com/print/2480/, downloaded from the Internet on Sep. 28, 2017.

(Continued)

*Primary Examiner* — Charles M Swift
(74) *Attorney, Agent, or Firm* — Chen Yoshimura LLP

(57) ABSTRACT

A method and apparatus for "ring fencing" an operating system, with any apps or programs running on that operating system, in such a way that all operations of the apps, programs, and operating system use real resources only with the permission or through the intermediation of a resource allocator programmed to allow only secure access to a known finite set of resources. The list of kinds of resources is short, and the list of resources is under the explicit control of the resource allocator, which is programmed with Communicating Sequential Processes techniques so as to give formally verifiable assurance of predefined security requirements. At the same time, the full features of the operating system are supported with minimal changes in its kernel and no changes in app or program binary code that accesses real resources via calls or bytecode that drives dynamic system libraries or a runtime environment.

17 Claims, 10 Drawing Sheets

(51) Int. Cl.
*G06F 9/48* (2006.01)
*G06F 21/62* (2013.01)
(52) U.S. Cl.
CPC ...... *G06F 9/45541* (2013.01); *G06F 9/45558* (2013.01); *G06F 9/4881* (2013.01); *G06F 9/505* (2013.01); *G06F 9/5027* (2013.01); *G06F 9/5061* (2013.01); *G06F 9/5066* (2013.01); *G06F 9/5077* (2013.01); *G06F 21/629* (2013.01); *G06F 2009/45579* (2013.01); *G06F 2009/45583* (2013.01); *G06F 2009/45595* (2013.01)
(58) Field of Classification Search
CPC . G06F 2009/45579; G06F 2009/45583; G06F 2009/45595; G06F 9/50; G06F 9/5027; G06F 9/5061; G06F 9/5077
See application file for complete search history.

(56) References Cited

U.S. PATENT DOCUMENTS

| | | | |
|---|---|---|---|
| 6,757,897 B1 | 6/2004 | Shi et al. | |
| 7,171,479 B2 | 1/2007 | Buchanan et al. | |
| 7,512,718 B2 | 3/2009 | Dickson | |
| 7,822,882 B2 | 10/2010 | Dickson | |
| 8,140,523 B2* | 3/2012 | Fakhouri | G06Q 10/06 707/720 |
| 8,352,941 B1* | 1/2013 | Protopopov | G06F 9/45558 718/1 |
| 8,789,063 B2 | 7/2014 | Hodson et al. | |
| 9,411,641 B2 | 8/2016 | Dickson | |
| 9,558,041 B2* | 1/2017 | Vadkerti | G06F 9/45558 |
| 2007/0234356 A1* | 10/2007 | Martins | G06F 8/63 718/1 |
| 2009/0300215 A1* | 12/2009 | Gnanasambandam | H04L 67/104 709/242 |
| 2010/0011237 A1* | 1/2010 | Brooks | G06F 9/455 713/502 |
| 2010/0058335 A1* | 3/2010 | Weber | G06F 9/45558 718/1 |
| 2010/0083252 A1* | 4/2010 | Eide | G06F 9/45558 718/100 |
| 2011/0038254 A1* | 2/2011 | Hashiguchi | H04L 45/1283 370/217 |
| 2011/0072428 A1* | 3/2011 | Day, II | G06F 9/45558 718/1 |
| 2011/0296406 A1* | 12/2011 | Bhandari | G06F 9/5044 718/1 |
| 2011/0296412 A1* | 12/2011 | Banga | G06F 9/5027 718/1 |
| 2012/0284712 A1* | 11/2012 | Nimmagadda | G06F 9/5077 718/1 |
| 2012/0331461 A1* | 12/2012 | Fries | H04L 67/2861 718/1 |
| 2013/0152207 A1* | 6/2013 | Cui | G06F 21/53 726/26 |
| 2015/0040124 A1* | 2/2015 | Tsirkin | G06F 9/4555 718/1 |
| 2015/0058839 A1* | 2/2015 | Madanapalli | G06F 9/45558 718/1 |
| 2015/0146580 A1* | 5/2015 | Olivier | H04L 65/1046 370/261 |
| 2017/0123830 A1* | 5/2017 | Dow | G06F 9/45558 |
| 2017/0133104 A1* | 5/2017 | Darbari | G06F 11/2221 |

OTHER PUBLICATIONS

Dickson, "Crawl-Space Computing." Amazon, 2014, Sections 1.4.4, 2.4, 3.2.2, and 4.4.1.
Dickson, "occam (TM) Road Map for the DOS PC," Proceedings of the 1996 International Conference on Parallel and Distributed Processing Techniques and Applications (PDPTA'96), Hamid R. Arabnia, editor. CSREA, Sunnyvale CA, 1996.
Hajnoczi, "KVM Architecture Overview, 2015 Edition", Redhat, Feb. 16, 2015. vmsplice.net/~stefan/qemu-kvm-architecture-2015.pdf.
Inmos Ltd: "Transputer Instruction Set, a Compiler Writer's Guide." Prentice-Hall, New York, 1988, pp. 40-41, 45-48 and 87-88.
Inmos Ltd: "occam2 Reference Manual." Prentice Hall, 1988, p. 18-21 and 71-72.
Kerrisk, Michael: "The Linux Programming Interface." No Starch Press, 2010, pp. 1331-1336, 1358-1363, and 1369-1370.

* cited by examiner

US 10,496,439 B1

FINITE RESOURCE ALLOCATOR WITH INTRINSICALLY SUBORDINATE OPERATING SYSTEM

GOVERNMENT LICENSE RIGHTS

This invention was made with government support under Contract No. N68335-17-C-0006 awarded by the United States Department of Defense. The government has certain rights in the invention.

BACKGROUND OF THE INVENTION

Field of the Invention

This invention relates to a computer system, and in particular, it relates to a computer system that implements a method and apparatus for securing and isolating an operating system.

Description of Related Art

The use of operating systems under forms of virtualization, from classic data-center-based computing (e.g. IBM System/370) through modern type 1 hypervisors, is known, as are virtual machine monitors such as QEMU and KVM. The movement of a Linux kernel into user space is known and supported in the kernel as User-Mode Linux (UML). All of these are stack-based, and in systems with memory protection certain calls or enters cause a change in the protection level, allowing host-level master actions. This set of prior art will in what follows be called "stacky prior art".

Message passing between system parts is known in the form of microkernels, and embedded code with strict message passing is known in the form of the classic INMOS Transputer programmed in occam. Here, "strict" means strictly following the definition of channel in CSP. There have been other types of channel communications in the computing art derived from CSP, that have added features such as buffering, interruptibility, exceptions, and other features that would not qualify as "strict". A message passing is "strict CSP channel message passing" if, when treated as a CSP channel in CSP formal verification, the results of the formal verification thereby implied are always correct. Telephone switchboards that use physical connectors are a forerunner of another part of our art. All of these are distributed by nature, and when well designed involve exclusive ownership of resources. This set of prior art will in what follows be called "insular prior art".

Some relevant examples of stacky prior art are shown in the top three rows of drawings in FIG. 1.

To the left are examples of standard system calls going through the system libraries or the runtime environment. To the right are direct system entries from within the application binaries. Above the dotted line is user (Ring 3) code, and below is privileged (Ring 0) code. The first row is a standard run, the second is a run over a hardware (Type 1) virtual machine guest, and the third is a run over a User Mode Linux guest. Details are found in the discussion of the Figures, below. Other prior art, including Type 1 and Type 2 hypervisors, functions in a stacky fashion that is a variant of the UML drawing.

Notable in all cases is that significant work is done in Ring 0, as a part of the execution trace. This is obvious in the standard case, but hidden in the virtual cases. It is characteristic of stacky prior art (which includes all prior art involving operating systems) that technical discussions, e.g. De Galas, Johan: "Hardware Virtualization: the Nuts and Bolts", Anandtech, Mar. 17, 2008, available from the Internet at http://www.anandtech.com/print/2480/, and Hajnoczi, Stefan: "KVM Architecture Overview, 2015 Edition", Redhat, Feb. 16, 2015, available from the Internet at vmsplice.net/~stefan/qemu-kvm-architecture-2015.pdf, speak of a tool's position "in the stack." But the stack-centric design causes a single execution trace to wander through many regions of different privilege and different responsiveness, leading to insecurity and lack of smoothness of execution.

This is not true of the insular prior art, insofar as it is insular. The microkernels, of course, are insular only within themselves in certain features, and are stacky when called from user and library outside, as in FIG. 1 top three rows. However, the insularity of microkernels allows features to fall away without harm to the whole. Newer Windows systems, for instance, have enough microkernel character that they can endure the loss of graphics without ceasing to function.

The other prior art examples, shown in FIGS. 2 and 3, are more purely insular. There is no gradation of privilege; it is absolute but territorial. FIG. 2 shows communication in a classic occam program running on Transputers, where all information and timing exchange goes through the channels—whether hardware or software. FIG. 3 shows a hardware switchboard, where communication becomes possible if and only if an explicit connection exists, and only as long as it exists. In such cases, program function can survive the failure or invalidation of the channel or one of the partners, and resume after these returns. In addition, there is no hidden communication, a fact of great importance for security.

Unfortunately, this purely insular prior art does not support the massive operating systems of our day, and thus is not easily used to run existing apps or programs. It is typically embedded and small-scale, and even the great Transputer developments were "flat" in the sense of being newly written and not bringing in the deep legacy of the programs developed outside the project.

QEMU actually uses a hybrid architecture that combines event-driven programming with threads. It makes sense to do this because an event loop cannot take advantage of multiple cores since it only has a single thread of execution. Here a variety of the stacky prior art adopts some of the characteristics of the insular prior art, but in the end it is stacky, because, as in all the other prior art virtualization technologies, there is a further stack beneath it leading its instruction trace to Ring 0.

The final example of Transputer art is the T9000, which for the first time introduced low-privilege processes, called P-processes. Each P-process is coupled with its own high-privilege L-process, to which it can ascend via traps. None of the Transputer's characteristic parallel, timer, communication, or alternation instructions can be run by a P-process, only C-like instructions. No P-process is capable of CSP communication with another P-process, with an L-process, or with another device. Thus, the T9000 offers only the privilege advancement mechanism characteristic of standard memory-protected, operating-system-based CPUs and virtual machines already described above.

SUMMARY

A method and apparatus for "ring fencing" an operating system, with any apps or programs running on that operating system, in such a way that all operations of the apps, programs, and operating system use real resources only with the permission or through the intermediation of a resource allocator programmed to allow only secure access to a known finite set of resources, is disclosed. The list of kinds of resources is short, and the list of resources is under the explicit control of the resource allocator, which is programmed with Communicating Sequential Processes techniques so as to give formally verifiable assurance of predefined security requirements. At the same time, the full features of the operating system are supported with minimal changes in its kernel and no changes in app or program binary code that accesses real resources via calls or bytecode that drives dynamic system libraries or a runtime environment.

Using this method and apparatus, programs, apps, and operating systems that are dynamic or insecure can be forced to behave according to static, finite, and secure standards. The great simplification and predictability imposed by the Finite Resource Allocator can be used to provide provable security, real-time smoothness of program flow, diversification of means of communication, simplification or elimination of stacks, and responsiveness to external stimuli, even if the programs or apps on the operating system do not have these features. A Finite Resource Allocator can replace and be much more lightweight than a Real-Time Operating System. Multiple apps can share one hardware or Finite Resource Allocator platform and be securely ring-fenced from one another. In addition, the "running out of steam" or limited apps count problem currently found on handheld devices can be solved without resorting to browsers or to the cloud, and apps can be prevented from disrupting each other. Embodiments of this method and apparatus can be used in Internet of Things for medical devices, factories, radiation-hardened applications, and performance and reliability enhancement as in supercomputing applications.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a device for running application programs, which includes: one or more memories having instructions stored thereon; one or more processors addressing the memories and configured to execute the instructions; and a finite nonempty set of resources, each resource being a connection from one of the processors to an external device outside the memories and processors; wherein the instructions include a finite resource allocator (FRA) which is a program of a first type and one or more intrinsically subordinate operating system (ISOS), each ISOS being a program of a second type which is configured to run one or more application programs on it, wherein the FRA and each ISOS are independent Communicating Sequential Processes (CSP) processes which communicate with each other only by strict CSP channel message passing, and only the FRA communicates with or controls any resources, and any ISOS communicates with any resource only indirectly through the FRA or by explicit permission of the FRA.

In another aspect, the present invention provides a system for embedded actuation, sensing and control or for high performance supercomputing, which includes: a master, the master being a device described above; and one or more servants, each servant including: one or more memories having instructions stored thereon; one or more processors addressing the memories and configured to execute the instructions; and a finite nonempty set of resources, each resource being a connection from one of the processors to an external device outside the memories and processors; wherein the instructions include a finite resource allocator (FRA) which is a program of a first type, wherein the FRA is a Communicating Sequential Processes (CSP) process, wherein the master's resources include one or more communicating links to one of the servants, and every servant's resources include one or more communicating links to another servant or to the master, and all of the communicating links of the master and the servants collectively establish direct or indirect communication between every servant and the master, and wherein all communication over the communicating links is by strict CSP channel message passing.

In another aspect, the present invention provides a cluster for high reliability operation in destructive environments, which includes: more than one master collaborators, each master collaborator being a device described above; and zero or more servants, each servant including: one or more memories having instructions stored thereon; one or more processors addressing the memories and configured to execute the instructions; and a finite nonempty set of resources, each resource being a connection from one of the processors to an external device outside the memories and processors; wherein the instructions include a finite resource allocator (FRA) which is a program of a first type, wherein the FRA is a Communicating Sequential Processes (CSP) process, wherein all the master collaborators and all the servants if any together form a network; wherein the resources of every member of the network include one or more communicating links to at least one other member of the network, and all of the communicating links collectively establish direct or indirect communication between every member of the network and every other member of the network, and wherein all communication over the communicating links is by strict CSP channel message passing.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

Some of the terms below are more fully explained in the following discussions.

DETAILED DESCRIPTION OF PREFERRED EMBODIMENTS

Figure 1A:
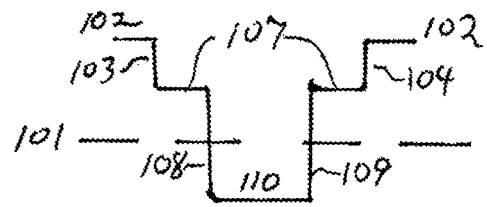
FIGS. 1A-1F are a set of call stack depth vs time lines for system resource access using prior art.
Figure 1B:
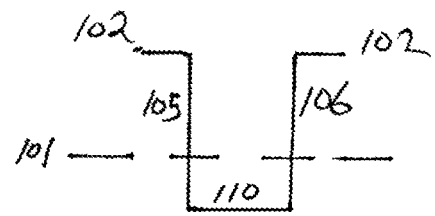
Figure 1C:
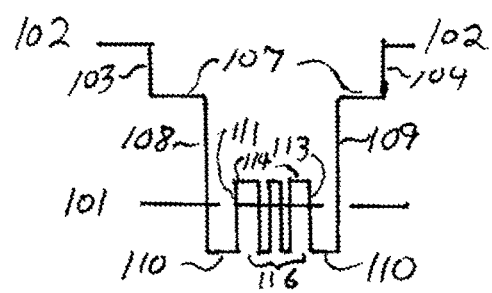
Figure 1D:
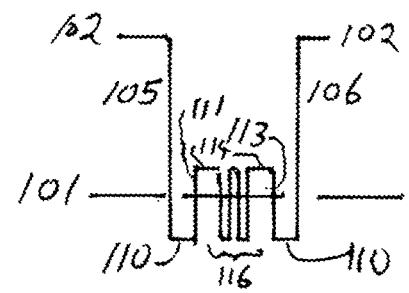
Figure 1E:
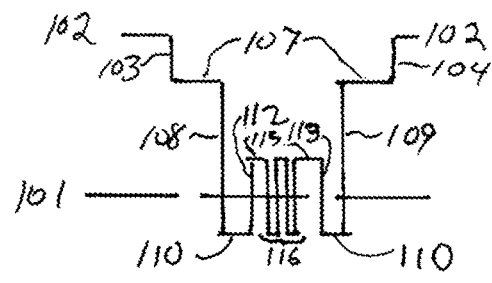
Figure 1F:
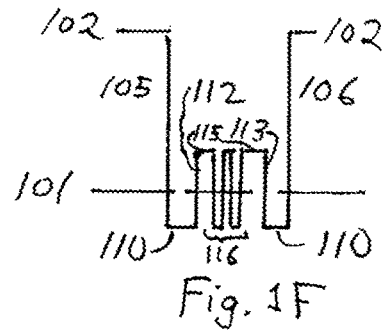

Technical Acronyms and Abbreviations
ALT Alternation
BIOS Basic Input/Output System
BT Binary Translation
CPLD Complex Programmable Logic Device
CPU Central Processing Unit
CSP Communicating Sequential Processes
DOS Disk Operating System
FPGA Field-Programmable Gate Array
FRA Finite Resource Allocator
FRAISOS Finite Resource Allocator with Intrinsically Subordinate Operating System (this invention)
ISOS Intrinsically Subordinate Operating System
ISR Interrupt Service Routine
KVM Kernel-based Virtual Machine
OS Operating System
PCP Potential Communicating Partner
QEMU Quick Emulator
ROM Read-Only Memory
RTOS Real-Time Operating System
RS232 Recommended Standard 232, a standard for serial communication
TCP/IP Transmission Control Protocol/Internet Protocol
TSS Task State Segment
UML User-Mode Linux
VMM Virtual Machine Monitor
Overview A technique according to embodiments of the current invention subordinates the operating system (OS) to a finite resource allocator (FRA), constructed according to the principles of classic Communicating Sequential Processes (CSP). The operating system, and programs or apps running in it, access real resources, defined below, only through the intervention or permission of the FRA. See FIG. 4.

The OS, which may be a standard OS like Linux, is a necessary part of the current embodiment, thus distinguishing it from classic embedded code of the CSP type, such as Transputer occam. Because of the presence of the operating system, a huge body of work is preserved without having to be reinvented, and all apps or programs that run on the OS and its runtime system libraries or on a runtime environment will work without change even as binaries.

The operating system is a necessary part of the current embodiment, but it occupies the unusual position of subordination. This goes beyond the apparent subordination of a UML kernel or other guest kernel in a virtualizing system, which when its call sequence is closely examined includes guest kernel calls that invoke host kernel or hypervisor Ring 0 code. For example, even a Type 1 hypervisor is on the stack and is thus in the execution trace of the guest. The massive troubles of dealing with this privilege change within the execution trace have been acknowledged.

By contrast, the subordination of the OS is in this embodiment complete throughout all the operative parts of the OS's instruction trace, and in fact through all the OS's instruction trace except for possible hardware-enforced kernel entry that immediately returns control to the subordinate OS without performing any substantive actions. The technical possibility of this behavior is shown in Linux by the use of ptrace in UML. Because the Intrinsically Subordinate Operating System (ISOS) cooperates with the Finite Resource Allocator (FRA) always and only through CSP-type channel communication, its instruction trace avoids substantive privilege change and performs all substantive actions as unprivileged. By following what is now accepted as good coding practice, it can completely avoid privilege change by using system library calls or a Java-like runtime environment. Thus, the rare and non-substantive dips into Ring 0 are only at points of direct kernel access in DOS-like legacy binary code. In some embodiments, "purity" binary translation (BT) may be used to eliminate these entirely, and thereby insure that privileged instructions are completely removed from the instruction trace of ISOS and its program or programs.

Necessary for this embodiment is CSP channel communication that is capable of communicating securely and speedily between the unprivileged ISOS and the always-privileged FRA. Such communication channels are built using knowledge included in prior art (Transputers) and in inventor Lawrence Dickson's published work (Dickson, Lawrence: "Crawl-Space Computing." Amazon, 2014 ("[DickC]", Sections 1.4.4, 2.4, and 3.2.2), and Dickson, Lawrence: "Occam™ Road Map for the DOS PC," Proceedings of the 1996 International Conference on Parallel and Distributed Processing Techniques and Applications (PDPTA '96), Hamid R. Arabnia, editor. CSREA, Sunnyvale Calif., 1996 ("[DickR]")) and inventively applied as follows.

The CSP-related prior art, including Lawrence Dickson's previous publications, above referenced, and his U.S. Pat. Nos. 7,512,718, 7,822,882, and 9,411,641, proves the full capability of the CSP-based channel communication to perform the functions necessary for the current embodiment. These functions are: memory including memory-like interfaces of various types, some read-only and some writable, explicitly defined and limited according to a known top-down design; and communications including timing either input from anything outside the ISOS program flow, or output to anything outside the ISOS program flow.

The words "real resources" will henceforth be used to refer to all physical (as opposed to virtual) entities required to perform the functions mentioned in the above paragraph. Thus, real resources include memory of various types, some read-only and some writable, and real communicating entities including timers and actuators which are outside the ISOS program flow and either supply a signal which is asynchronous to the ISOS program flow, or receive an effective signal which is generated by the ISOS program flow. In this disclosure, the term "resources" also refers to connections from the memories and processors to the corresponding real resources. The meaning of each instance of the term in the disclosure can be ascertained from its context.

Figure 5:
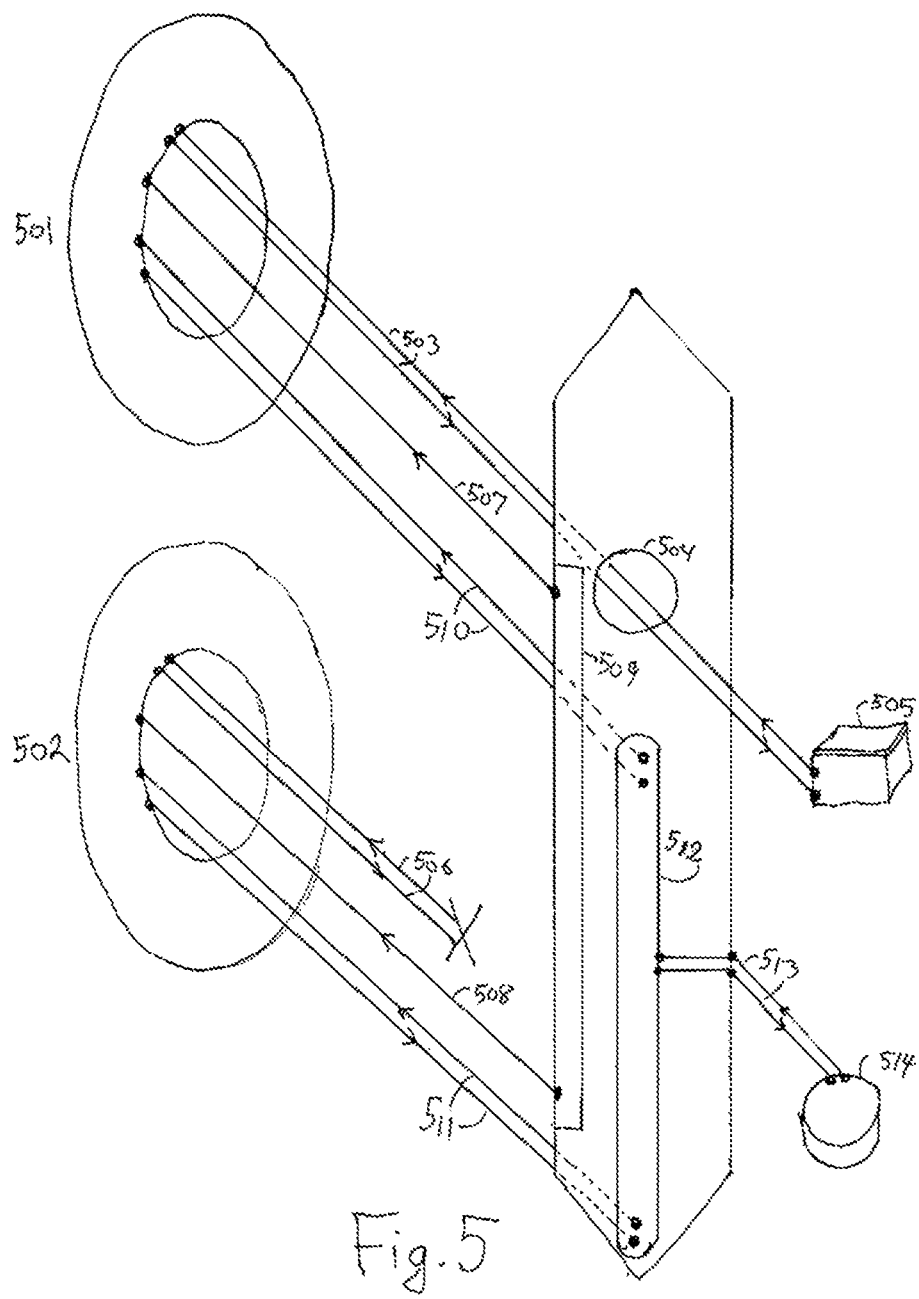
FIG. 5 displays the three ways in which an ISOS may gain real or virtual access to a resource.

Real resources are dealt with correctly in three ways (FIG. 5). The first way is for the resource to be read-only and not subject to change during the life of the ISOS program, by that program or by anything else on the platform. An example is the binary code running the ISOS program. The second way is for the resource to be under the sole ownership of the IS OS, unreadable and unwritable by the FRA or any other ISOS. An example could be a scanner/printer attached only to this ISOS, able to be driven by direct port communication. In some embodiments, ownership of the resource may be loaned to the FRA or to another IS OS, and possibly returned later. The third way is for the resource to be inaccessible to the ISOS or its program, accessed only by the FRA and virtualized with CSP-based communication to and from the ISOS or its program. In this embodiment, "inaccessible to the ISOS or its program" includes the meaning "inaccessible to anything called by the ISOS or its program, including soft interrupts, SYSENTER or SYSCALL, or any other devices that lead the ISOS or its program's instruction trace into code that can directly access this resource." These will be referenced in the following as "first way", "second way", and "third way", respectively.

The technological foundation for the third way and the loan-and-return subset of the second way is CSP as expanded by the References above mentioned. The enabling technology is message-passing, including (in the subset of the second way) ownership grant messages as well as data-carrying and timing messages. See FIGS. 6A and 6B. The prior art includes occam ALT, also embodied in interrupt vectoring, Unix-like select( ) and Windows WaitForMultipleObjects( ) and in all event coding, permitting prompt response to message-passing that can be initiated by any of several partners. See Inmos Ltd: "occam2 Reference Manual." Prentice Hall, 1988 ("[Io]"), page 18-21 and 71-72, Inmos Ltd: "Transputer Instruction Set, a Compiler Writer's Guide." Prentice-Hall, New York, 1988 ("[I]"), page 40-41, 45-48, and 87-88, and Kerrisk, Michael: "The Linux Programming Interface." No Starch Press, 2010 ("[K]"), pages 1331-1336, 1358-1363, and 1369-1370.

Promptness of response is crucial. It is known from the occam References that a CSP/occam message-passing state machine (including ALT) works correctly and responds promptly even if one of the communicating partners has a lower priority (is interruptible by) the other. This is demonstrated by the communication design for Transputer priorities 0 and 1 (see [Io] and [I]). Compare FIGS. 7A-7C. It is also known (see [DickR]) that promptness is preserved if one, but not more than one, of the potentially communicating occam-like processes is stacky, even though that process may block and unknown multitasked program flow may go on without it. The other simultaneous processes also may use the stack, if they do not deschedule without emptying their stack, even if they may be interrupted by higher priority processes that themselves use the stack (see [DickR]). This fact applies to the current embodiment, even if more than one ISOS is simultaneously active, because each ISOS has its own stack structure. Stack handling within each ISOS is unchanged, though in some embodiments, FRA events may push data to the top of a stack.

Using these facts, this embodiment performs all third way and loan-return second way resource accesses through communications implemented in the CSP-type fashion both in the CSP-coded FRA and the stacky IS OS. Communications to the FRA take the place of system calls or instruction trace entry into kernel space. They retain their character: for example, system call read( ) blocks until the read is complete, and the corresponding FRA communication does not acknowledge until the FRA has completed the read for the ISOS; and system call aio_read( ) enqueues a read request and immediately returns, and the corresponding FRA communication acknowledges as soon as the FRA has enqueued the read request on behalf of the ISOS.

The FRA may be minimalistic and serve the real or "raw" resources while it may avoid, insofar as possible, involving itself with the constructs imposed by the operating system on those resources. These may be left in the subsidiary kernel or equivalent ISOS coding. For example, large numbers of processes may access many files via many different file descriptors, and yet FRA may concern itself only with explicit seeks, reads and writes on the underlying disk.

The FRA is built as a finite, top-down-defined CSP process of the occam type. Its resources and its sub-process structure are explicitly finite. It deals only with an explicit finite list of external (real) resources, and each kind of internal resource is also from an explicit finite pool and has an explicit finite limit of simultaneous activation. This imposes limits on the behavior of the ISOS and its programs which will be diagnosed as overflow error states if the dynamic features of the ISOS or its programs go too far.

For efficiency, the FRA may expand on the occam-like CSP model by permitting channel moves as well as channel copies. This requires the second-way loan-and-return capability for memory (see [DickC], Section 4.4.1). For security, the FRA may expand on the occam-like CSP model by emulating switchboard operation through mobile channel ends. This permits whitelisted communication without specifying the means of communication.

For responsiveness, the FRA may use multiple priority levels. The two level system found on the Transputer is also in essence reflected by interrupt service routines which most processors support. Some embodiments of the FRA may reach provable responsiveness by using the system of Lawrence Dickson's U.S. Pat. No. 9,411,641, which details how to reach such provable responsiveness using a small number of priorities, greater than 2.

The above-described explicit finiteness of the Finite Resource Allocator is a requirement of this embodiment. It permits provable limits on response time, provable code correctness and avoidance of memory and other resource overflow, and enumerable and explicitly describable complexity limits that can be used to test OS apps or programs. The programming of the finite limits must be explicit, so that a certain predefined number is reliably reached based on knowledge available at start of run of each ISOS or bounded program. It must not be implemented merely as an unpredictably reached capacity of a dynamic expansion. The explicit finiteness of the FRA may coexist with any kind of lack of explicit finiteness, such as unlimited or practically unlimited dynamic features, in an ISOS running on the platform belonging to the FRA. Non-pathological programming running on such an ISOS will always behave within practical limits and may therefore run normally within the limits imposed by the FRA (see FIG. 8).

The connection of the FRA to hardware is a requirement of this embodiment. Even if there is only a single ISOS, and real resources, including memory and control and report communication such as keyboard/screen or RS232 serial or TCP/IP, are all second-way owned by the ISOS and directly accessed, the FRA must begin by granting ownership to the ISOS. If there is more than one ISOS, the FRA may grant an ISOS the ability to communicate with another ISOS as in FIG. 7B, such as when one ISOS is in charge of enterprise security for another ISOS. The design of the FRA must explicitly reference all the real resources to be used by any ISOS, and the FRA is adapted to the specific real resources used on the platform, so that real resources and FRA form a coherent whole.

The protocol of communication between the FRA and any ISOS is required to be well-defined. In some embodiments, a small or specialty ISOS may be created that functions with the FRA and can be used in testing it or for special purposes. The FRA may be designed so that any ISOS that satisfies the protocol will work, or, on the other hand, it may impose other requirements, for example a security key exchange or certificate.

Three Example Embodiments

To delve deeper into the usable specific embodiments of the invention, three examples are given, one a single device with FRA code on ROM, one an interrupt-based FRA that imposes real-time quality on non-optimal operating system, apps and programs on a standard device, and one a device with multiple connected embedded platforms, some of which have FRAs that communicate among said platforms. A "purity" BT is optional in all embodiments.

Embodiments of the invention may be implemented as computer readable program code stored in non-transitory medium. Some of these embodiments can use unrewritable code, such as cores, ROM code, and CPLDs. Others can use rewritable firmware customization as with FPGAs or rewritable BIOS on flash memory. They can be expressed as a hardware/software combination with suitable hardware on a standard device and suitably responsive software. Some specific examples include:

(A) Devices in which the FRA is in ROM code, and cannot be overwritten, and the FRA controls all hardware IO and other hardware resources.

(B) Devices similar to (A) in which the FRA, or part of it, is implemented on chip, in ASIC or in FPGA.

(C) Devices in which the FRA is introduced to the computer by plugging a storage device or dongle into USB (all types including microUSB), SD Card (all types including microSD), Sim Card (all types), Smart Card (all types), or similar receptacle or volume, and the FRA stored on the card, dongle or preferred volume then controls the computer from power-up and earliest boot to power-down. In devices optimized for different levels of security and other factors, the FRA may start to execute at a predetermined time or position within the boot sequence. Unlike standard boot, the FRA does not "hand off" to the operating system, but continues to control the ISOS through its entire time up. It is possible (not necessary) that the FRA may copy itself to a protected place in memory for efficient execution. Sim Cards and Smart Cards share similar electrical and mechanical specifications. Smart phones and tablets can have one or even two slots for Sim Card and/or Smart Cards. These cards provide both data storage and often crypto capability. As such they provide an electrical and mechanically available way to insert or provision FRA into these portable devices. The actual implementation depends on the boot sequence that a device (which is, or is nearly, an "off the shelf" device) is capable of executing. Thus, with little or no change, the formerly standard "OS" device becomes a FRAISOS device from power-up to power-down. A timeline would show (if designed for complete security) the FRA taking over directly from the ROM BIOS.

(D) "Hen and chicks" embedded IoT systems in which the "hen" contains FRA and ISOS, and the "chicks," which may be FRA only or also include ISOS, communicate only with each other and with the hen, as determined by FRA whitelist. This implementation is an extension of FIG. 11 and the third embodiment which is described in more detail later, and is illustrated in FIG. 12.

(E) Devices that may be of less demanding security requirements, in which the FRA may be implemented in rewritable Flash Memory.

(F) Devices that may be of less demanding security requirements, in which the FRA may be implemented in a real-time kernel or microkernel associated with specific hardware.

Figure 11:
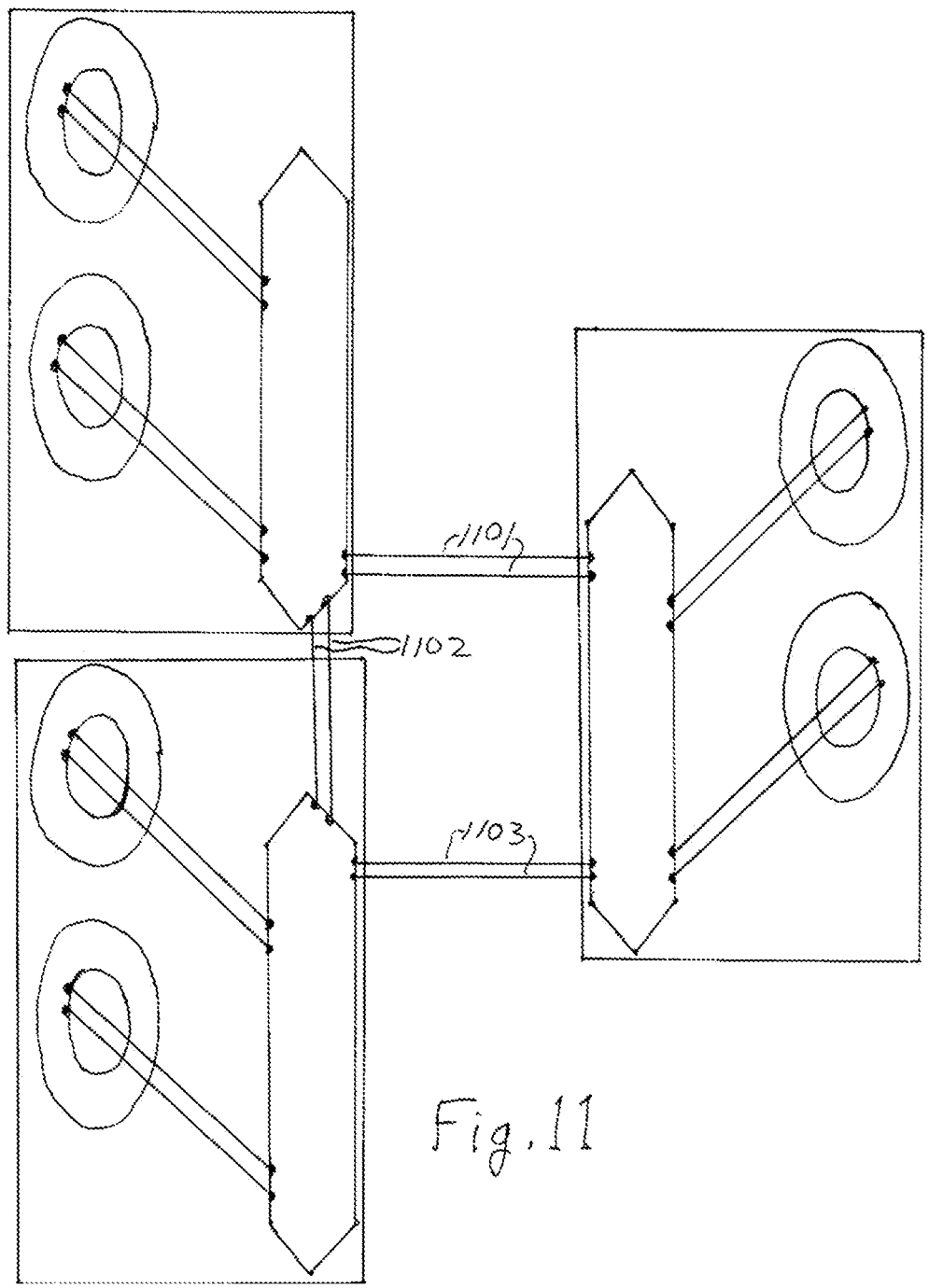
FIG. 11 shows the third embodiment, communicating FRAs on several embedded platforms.
Figure 12:
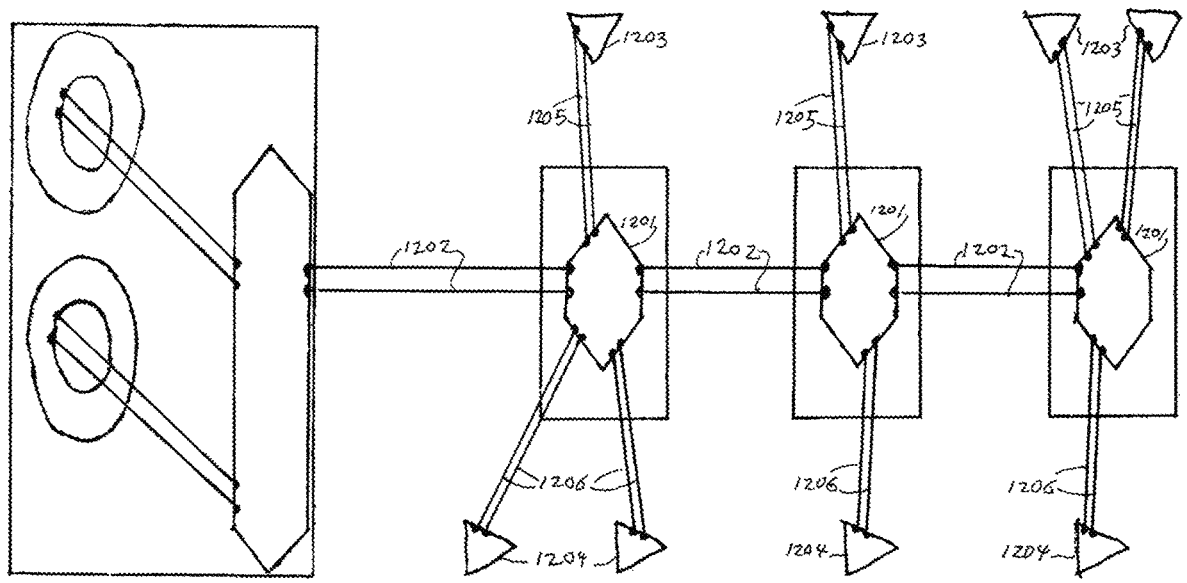
FIG. 12 shows the third embodiment, "hen and chicks'" network including FRA-only servant platforms.
Figure 13:
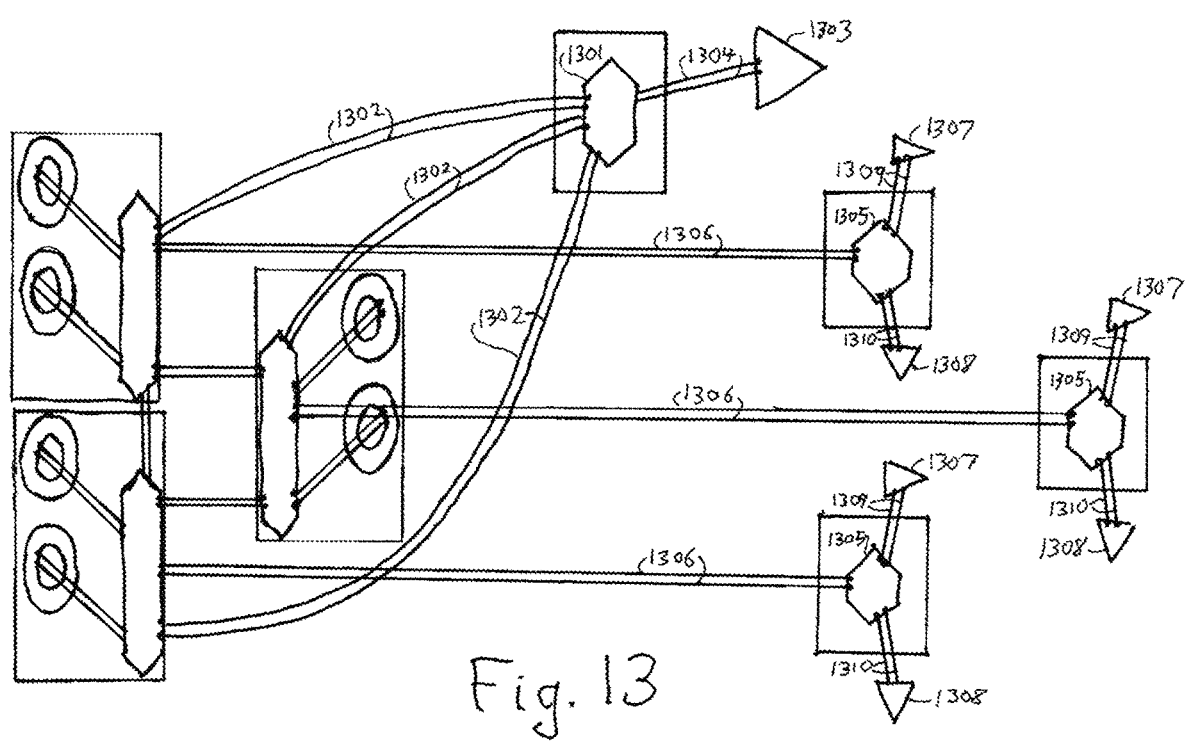
FIG. 13 shows the third embodiment, cluster for high-reliability operation including FRA-only servant platforms.

(G) Clusters for high reliability operation in destructive environments in which the repetition of platforms seen in FIG. 11 is combined with hardware and software that are capable of surviving destruction of components, and which may also include some of the "hen and chick" design mentioned in (D) above. This implementation is an embodiment or extension of FIG. 11 and the third embodiment which is described in more detail later, and is illustrated in FIG. 13.

All of these variants are provably equivalent using CSP design on the FRA as described in this disclosure. This is because CSP-based designs exhibit hardware/software equivalence. In terms of practical applications, embodiments of the present invention are applicable to autonomous vehicles, verticals within the IoT ecosystem, medical devices, Electronic Design Automation (EDA) cores for FPGA and ASIC design, secure tools in User Mode Linux (UML) whitelist management, with Multiple Guest OSs or single Guest OSs, secure Laptop, Desktop, Workstation, Server, SmartPhone/CellPhone, Tablet, CPU/GPU boot sequence, and embedded processor devices, etc. The FRA can occur at the beginning or at any point in the boot of the device depending on the design. The FRA can increase system security, system performance, and system reliability, and can pin down, know and block vulnerabilities while itself being incorruptible. The FRA can be a special, formally verified Piece that all the other Pieces depend upon among the ISOSs. The FRA can provide Priority and Interrupt Hierarchy, compatibly with known tools, and maintain Top Priority code and eliminate lost cycles when combined with our U.S. Pat. No. 9,411,641. The combination of FRA and ISOS reduces complexity and provides security, predictability, speed, and reliability. Based on the descriptions provided in this application, those of ordinary skill in the art will be able to implement these examples and practical applications without undue experimentation.

The first embodiment (FIG. 9) is a device optimized for security using Linux as ISOS. The Linux used is a fork of the classic User-Mode Linux, which instead of using an ARCH=um kernel that uses real ("kernel mode") system calls within the UML kernel to access real resources, instead uses CSP communication, including moves and mobile channel ends, to communicate with a FRA. Multiple ISOSs can be supported, using the ALT or select( ) capability of the FRA, and moves can be used to change ownership of allocated memory among the ISOSs. Mobile channel ends with secure verification of the identity of both communicating partners are available to restrict sourcing of code and information.

Programs or apps running on an ISOS can be assigned exclusive ownership of a port-based resource if desired, using Linux's Task State Segment (TSS) and making it writable only by the FRA, thus permitting binary code to run on the ISOS that uses in and out commands for rapid IO.

If there are direct SYSENTER/SYSCALL instructions in the program or app binary, BT may be used to convert these to system library calls. All system library calls can be modified so that either direct calls to the UML-like (non- Ring 0) user kernel code are made, or similar code is embedded in the library itself, thus avoiding all calls to Ring 0.

Since the FRA in this embodiment is not rewritable, it and all memory controlled by it are secure. Memory protection and resource protection capabilities are mastered by the FRA so that ISOS and program code, no matter how bad, cannot violate security. The worst that can happen is that sloppy code becomes unusable.

In the second embodiment, the FRA in combination with the hardware is adjusted to impose real-time quality on an OS and programs/apps that are not real-time. Typically, standard OSs have a response time of the order of milliseconds, from 4 (Linux) to 14 (Windows) in Lawrence Dickson's experiments. For quality, a response time of 50 us or less is needed.

The FRAISOS embodiment solves this problem because FRA is wholly privileged and top priority. Like DOS code, it can go at full speed with very slim ISRs due to not dealing with memory protection issues. The second embodiment FRA is written so as to optimize the qualities desired, such as video or audio smoothness, diversification of means of communication, simplification or elimination of stacks, responsiveness to external stimuli, quickness of control for stepper motors, pure averaging for pulse width modulation, and other embedded quality inputs and outputs, even if the programs or apps on the operating system do not have these features. Multiple apps can share one hardware or FRA platform and be securely ring-fenced from one another. In addition, by instituting a set delay, the information fed in by the ISOS program and its responses do not have to be so regularly distributed. See FIG. 10.

This approach can also be used if more than one ISOS and program are running. This allows the second embodiment to create a reliable instrument doing more than one task at once. FRAISOS makes this all possible without special hardware, requiring only careful analysis of the exact behavior of existing hardware, plus removal of the OS at the FRA level. In addition, the "running out of steam" or limited apps count problem currently found on handheld devices can be solved without resorting to browsers or to the cloud, and apps can be prevented from disrupting each other, since their running is organized by the FRA.

In these uses, the combination of FRA and ISOS may perform the functions commonly associated with an RTOS. The common OS of the ISOS may use easy or legacy programming, in contrast to the arcane and difficult RTOS, while the targeted FRA may be more lightweight and efficient than an all-purpose RTOS, and behave predictably according to specific design. After development and in the final version of a product, FRAISOS may entirely replace an embedded RTOS.

In the third embodiment (FIG. 11), there is a multiplicity of devices communicating. Each significant OS-running platform is an instance of the current embodiment, with the OS being an ISOS running under a FRA, and each FRA is capable not only of real resources required by its ISOS or ISOSs, but also of external CSP-type communication links. This is a known capability of CSP-type hardware/software combinations such as those using Transputers running on B008s, which can even do CSP-type communications with non-CSP-type hardware/software such as a DOS host. The third embodiment implements this in a modern form, for example the SpaceWire standard, which is a descendant of the very Transputer links referenced. Thus a network of intercommunicating FRAs on different platforms is created.

As frequently noted in embedded projects such as 3D printers, it is quite difficult to get the devices working properly in tandem, even if the response time constraints are apparently undemanding. FRAISOS eliminates one major cause of this problem, which is the tendency of OSs and object-oriented (app) languages to "batch" several operations at once. Though strictly correct, this leads to choppy output. As in the second embodiment, FRAISOS smooths this out.

In addition, the third embodiment with its rapid CSP-type communication between FRAs is able to keep up with the great speed and responsiveness often required by embedded devices. Typically, in the third embodiment, the FRA will also have capabilities in addition to those required by its ISOS or ISOSs, and these will permit high-quality embedded multiprocessing work to be done within the FRA domain itself. In some cases, the ISOS may be minimized to the point of a simple interfacer, and most of the development done on the FRA.

EXPLANATIONS OF DRAWINGS

FIGS. 1G, 1H, 4, 5, 6A, 6B, 8, 9, 10, and 11 contain cabinet projections in which the diagonal, representing a Z axis pointing out of the paper, denotes communication between independent processes in the CSP sense.

In FIGS. 1A-H, 6A, 6B, and 7A-7C, the horizontal axis is time. In FIGS. 1A-H and 6A, the vertical axis denotes pushing or popping of a call stack, and in those calls, time is ignored.

Figure 1G:
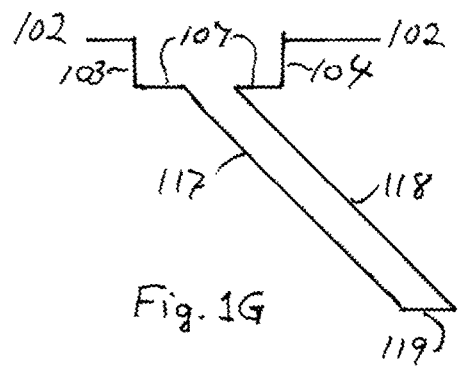
FIGS. 1G and 1H show the same as accomplished by embodiments of this invention, using communication between FRA and ISOS.
Figure 1H:
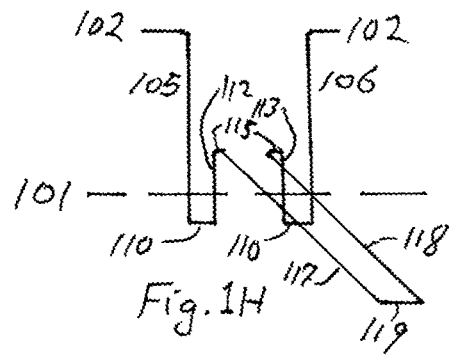

FIGS. 1A-1F are a set of call stack depth vs time lines for system resource access using prior art. FIGS. 1G and 1H show the same as accomplished by this embodiment, using communication between FRA and ISOS.

Figures on the left (FIGS. 1A, 1C, 1E, and 1G) represent system resource access using system libraries. Figures on the right (FIGS. 1B, 1D, 1F, and 1H) represent direct access to the resource using SYSENTER, SYSCALL, INT2e, or similar capabilities in the binary code for the application.

The top row (FIGS. 1A and 1B) is a standard OS use. The next two are virtual; the second (FIGS. 1C and 1D) show a hardware virtual machine monitor (VMM), and the third (FIGS. 1E and 1F) show soft virtualization (User Mode Linux).

The bottom row uses an intrinsically subordinate OS (ISOS) communicating with the finite resource allocator (FRA) according to the current embodiment.

101 (dotted line) is the boundary between kernel privilege (below) and user privilege (above). If it is not present (FIG. 1G), all the OS and application code remains in user privilege. 102 is application code running on the OS. 103 is the call to a system library function, and 104 is the return from that function. 105 is the direct kernel access (e.g. SYSENTER, SYSCALL, or INT2e) and 106 is the corresponding return (e.g. SYSEXIT, SYSRET, or iret).

107 is system library code running on the OS. 108 is kernel access from system library code, and 109 is the corresponding return to system library code. 110 is kernel code running at kernel privilege.

111 is binary translation (BT) returning from VMM hypervisor to user or Ring 1 privilege guest kernel in a VMM system, and 112 is ptrace-based UML returning from host kernel to user privilege guest kernel. 113 in both cases is a fault entry to the kernel due to an illegal attempt at a kernel return from non-kernel privilege. 114 is the user privileged or ring 1 privileged guest kernel code in a VMM system, and 115 is the guest kernel in a UML system. 116 are accesses from either of these to the kernel-privileged kernel to carry out resource access.

117 is communication of the resource request to the FRA, and 118 is the response of the FRA. 119 is FRA code running in response to the resource request.

Figure 2:
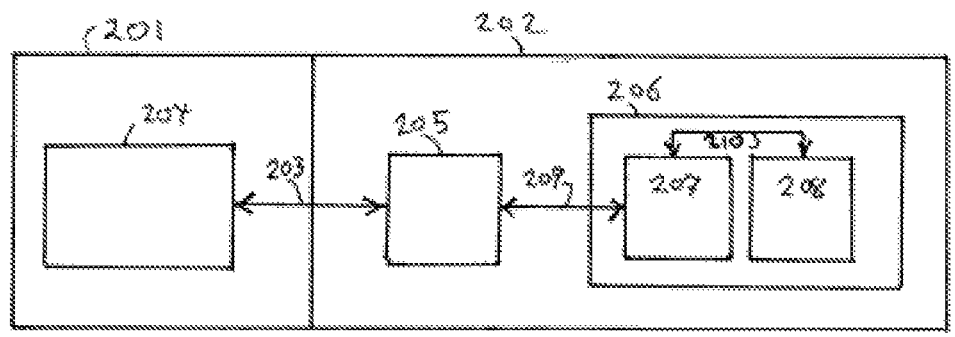
FIG. 2 is prior art displaying a purely insular system using CSP communication.

FIG. 2 is prior art displaying a purely insular system using CSP communication. 201 is the host side and 202 the embedded side of a CSP channel link adaptor connection 203. 204 is the host system with OS, 205 is an embedded CPU-based system without OS that functions as a debugging data passer, and 206 is the functioning insular embedded system consisting of two embedded CPU-based systems 207 and 208 connected by CSP link 209 to the debugging data passer and by CSP link 210 to each other. Although 204 is a normal OS-based system, it communicates with the embedded array only through CSP channel links, plus three optional global system services (not shown), Reset, Analyze, and Error.

Figure 3:
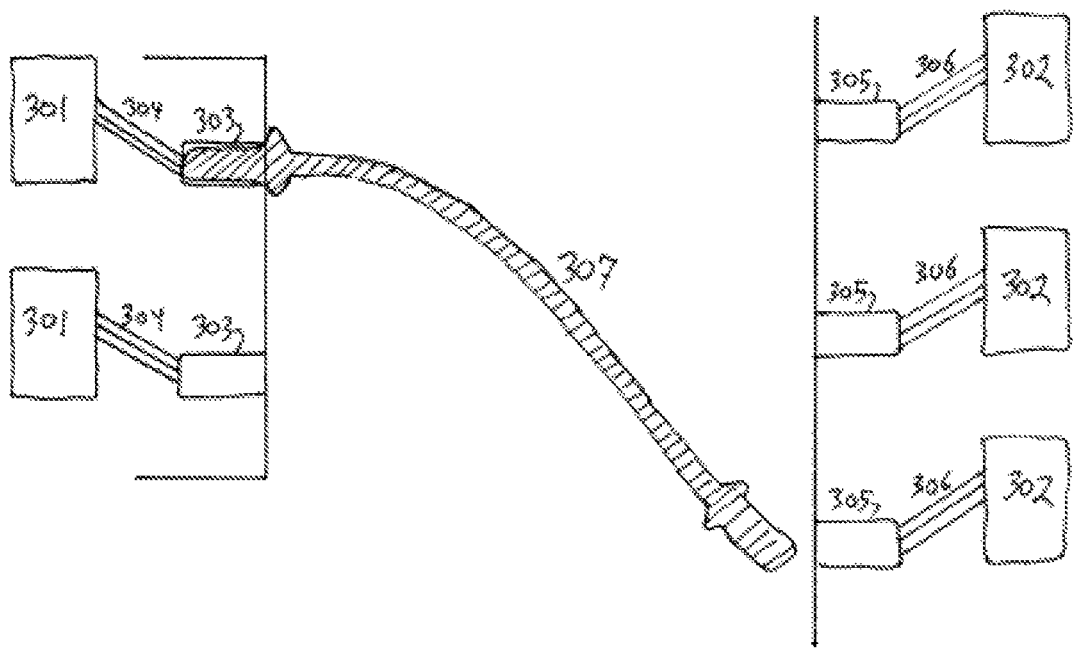
FIG. 3 is prior art, a classic switchboard.

FIG. 3 is prior art, a classic switchboard. 301 are two potential communicating partners (PCPs) on the left, 302 three PCPs on the right. Each left PCP connects to one left socket 303 via left wiring 304, and each right PCP connects to one right socket 305 via right wiring 306. A cord 307 is capable of connecting exactly one left PCP to exactly one right PCP. The connection is established if and only if the cord is plugged into both sockets at once, and exactly during the period of time while it remains so plugged in.

Figure 4:
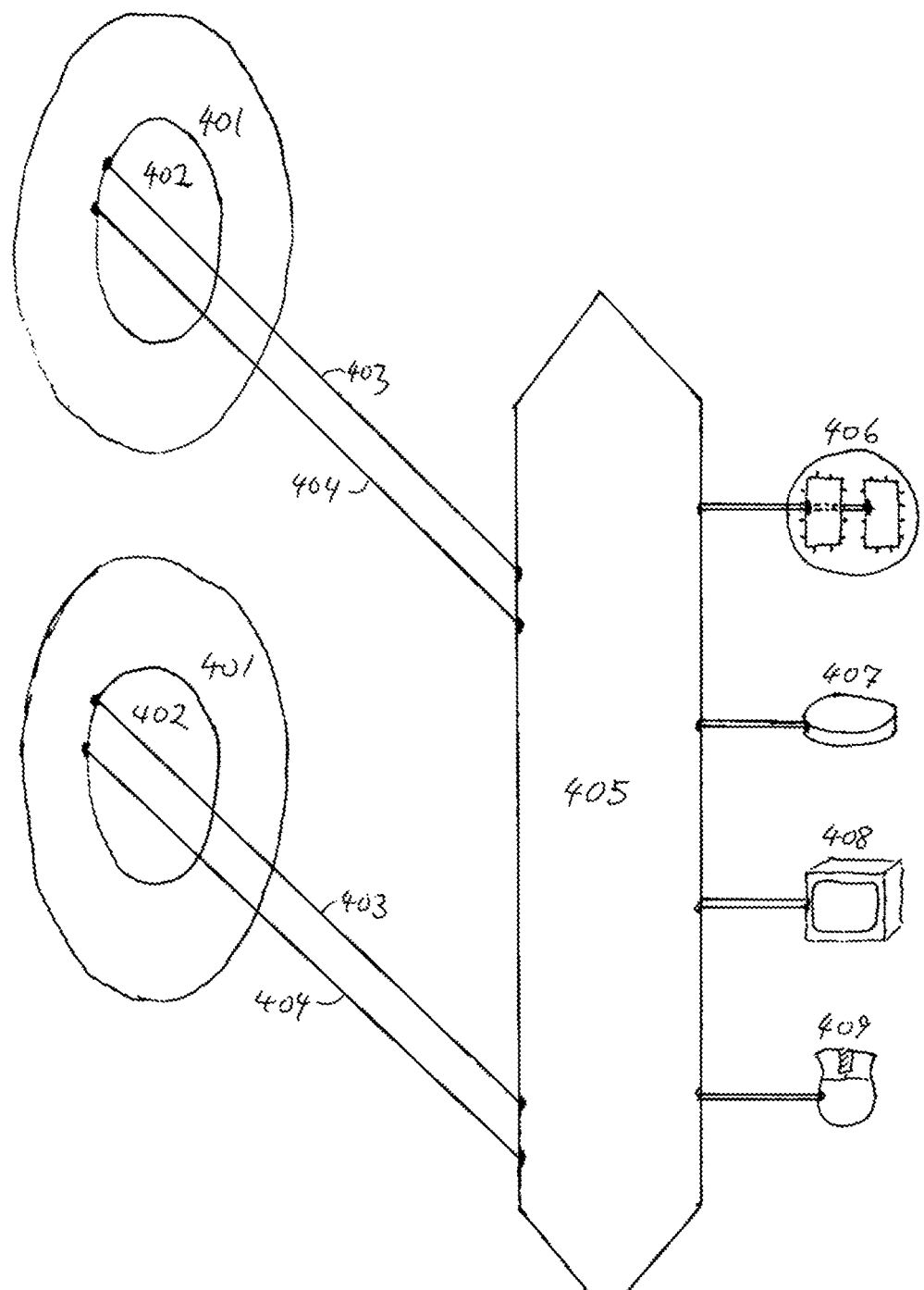
FIG. 4 illustrates an embodiment of the current invention, with two ISOSs to the left, FRA in the middle, and real resources to the right.

FIG. 4 is a simple sketch of an instance of the current embodiment, with two ISOSs to the left, FRA in the middle, and resources to the right. In each ISOS, the outer ring 401 includes system libraries, system call wrappers, and application code that calls them, all running in user or other lower privilege level; the inner region 402 is at kernel-level privilege but is not substantively used. Instead, bidirectional CSP-type communications 403, 404 reach the high-privilege FRA 405 which relays or authorizes all real resource usage, such as memory 406, disk 407, display monitor 408, and mouse 409, and other real resources, not shown.

In FIGS. 5, 9, 10, and 11, features of FIG. 4 are repeated and not explicitly labeled. The description of FIG. 4 is to be applied as appropriate to these.

FIG. 5 is in greater detail, and shows the three ways in which an ISOS may gain real or virtual access to a resource. ISOS A 501 and ISOS B 502 connect to the FRA and possibly directly to resources. The bidirectional connection 503 passes through the hole 504 in the FRA, which represents the fact that the FRA has granted to ISOS A full ownership of the scanner/printer 505, which is therefore directly accessed by ISOS A. The corresponding connection 506 from ISOS B is unable to connect and must not be used. By contrast, the read-only connection 507 from ISOS A and the corresponding read-only connection 508 from ISOS B may coexist and simultaneously access read-only memory 509. The bidirectional connection 510 from IS OS A and the bidirectional connection 511 from IS OS B also coexist, but communicate only as far as virtual disk 512 in the FRA, which in turn communicates via bidirectional connection 513 to real disk 514.

Figure 6A:
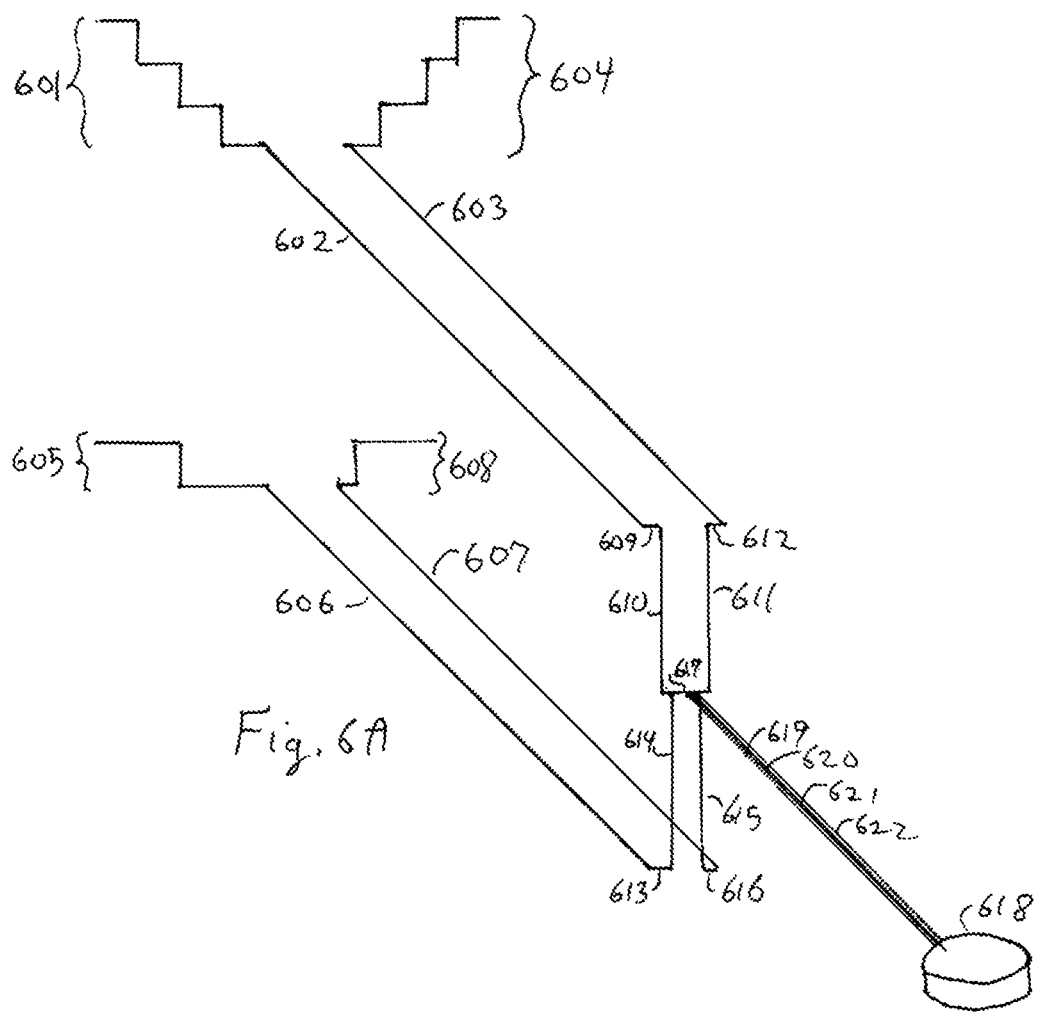
FIGS. 6A and 6B show two competing ISOSs accessing the same real resource, a disk.
Figure 6B:
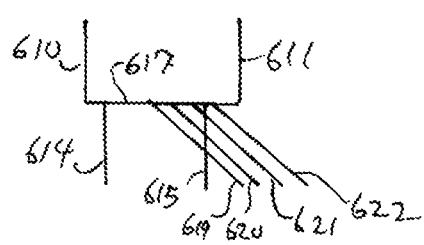

FIG. 6A shows two competing ISOSs accessing the same real resource, a disk. It may be a timeline like that of FIG. 1G, expressing an action of the disk connections shown in FIG. 5. FIG. 6B is a magnified view of the critical part of 6A, in which the ALT is a necessary functional part.

In FIG. 6A, the down stairsteps 601 denote ISOS A program code and stack use with library code leading to virtual disk access via CSP-type communications 602, while a virtual disk response via CSP-type communications 603 leads to stack use by ISOS A on the up staircase 604 returning to program code. Similarly, ISOS B program and library code 605 leads to competing virtual disk access communication 606, while disk response communication 607 leads to ISOS B library and program code 608. A CSP-type process, dedicated to ISOS A, within the FRA virtual disk responds to 602 with code 609 that leads to a CSP interprocess communication 610 to the FRA's central virtual disk process, which later uses another CSP interprocess communication 611 to trigger code 612 that generates 603. Similarly, a CSP-type process, dedicated to ISOS B, within the FRA virtual disk responds to 606 with code 613 that leads to a CSP interprocess communication 614 to the FRA's central virtual disk process, which later uses another CSP interprocess communication 615 to trigger code 616 that generates 607. The central virtual disk process 617 handles 610, 611, 614, 615, and communicates to the real disk 618 by a set of CSP-type communications 619, 620, 621, 622. The behavior of the central virtual disk process is described in greater detail in FIG. 6B.

FIG. 6B shows a necessarily single CSP-type process, in charge of a single resource, responding to asynchronous communication initiated by more than one independent partner processes. FIG. 6B shows the most difficult case, the requests 610 and 614 arriving at almost the same moment, and therefore requiring a CSP Alternation, or ALT. The time interval between is exaggerated for clarity. Also for clarity, the central virtual disk process is shown always running, when in reality it would probably deschedule and wait for more virtual requests and for disk status input. After a while, it is able to send real disk requests 619 and 620 to the disk, which comprise a superset of the disk action requested by 610 and 614. The disk responds by 621 (which confirms all the disk action needed by 614) and 622 (which, together with 621, suffices to fulfil the needs of 610). Interleaved with these are responses 615 and 611. This is only one example; other disk accesses may respond in a different relative order.

Figure 7A:
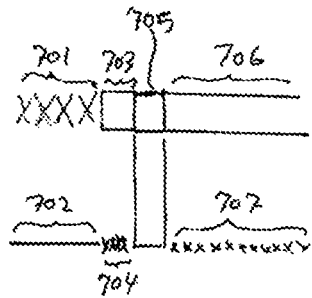
FIGS. 7A-7C show the timeline of a simple CSP communication between two CSP processes: 7A and 7C an ISOS and the FRA, and 7B two ISOSs.
Figure 7B:
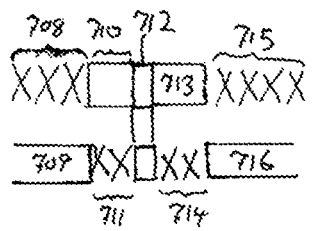
Figure 7C:
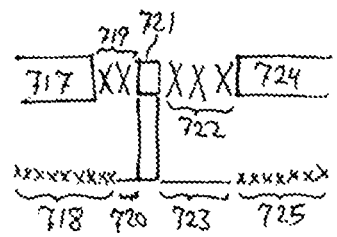

FIGS. 7A-7C show the timeline of a simple CSP communication between two CSP processes: FIGS. 7A and 7C an ISOS and the FRA, and FIG. 7B two ISOSs. All are examples of the worst case, multitasking on a single sequential core.

In all cases, a row of Xs refers to the CSP process being descheduled, either on a run queue or waiting for a communication. FIGS. 7A and 7C are consistent with the FRA having a higher priority than the ISOS. FIG. 7A shows the FRA coming ready before the ISOS, FIG. 7B shows two ISOSs with the bottom one coming ready first, and FIG. 7C shows the ISOS coming ready before the FRA.

In FIG. 7A, 701 shows the ISOS descheduled at the same time as 702 shows the FRA code running. The end of 702 is the unready communication. 703 shows the ISOS code running and 704 shows the FRA descheduled waiting for communication. At the end of 703, the ISOS comes to the communication. 705 shows the communication, possibly followed by more FRA code running until it descheduled. 706 shows ISOS continuing to run while 707 shows the FRA descheduled.

In FIG. 7B, 708 shows the top ISOS descheduled while 709 shows the bottom ISOS running until blocked by the unready communication. 710 now shows the top ISOS running or catching up till it is ready for that communication, while 711 shows the bottom ISOS waiting. 712 is the communication. 713 shows the top ISOS does not "let go" after the communication, while 714 shows the bottom ISOS waiting in a queue. When the top ISOS deschedules, 715 shows it inactive, while 716 shows the bottom ISOS resuming with its communication completed. The timeline of FIG. 7B is consistent with only these two ISOSs and the FRA currently inactive.

In FIG. 7C, 717 shows the ISOS running until blocked by an unready communication. 718, the descheduled FRA, lasts longer than 717, indicating that the FRA is blocked by another communication or timer, not shown. 719 shows the descheduled ISOS awaiting the communication. 720 shows the last resumption of the FRA until it catches up with the communication needed by the ISOS. 721 is the communication. In 722, the ISOS remains descheduled, because the communicating FRA has put it on the run queue. In 723, the FRA is shown continuing to run during this period, until it descheduled. Then the ISOS starts to run 724 and the FRA remains inactive 725. The timeline of FIG. 7C is consistent with the FRA being influenced by other timers or ISOSs not shown.

Figure 8:
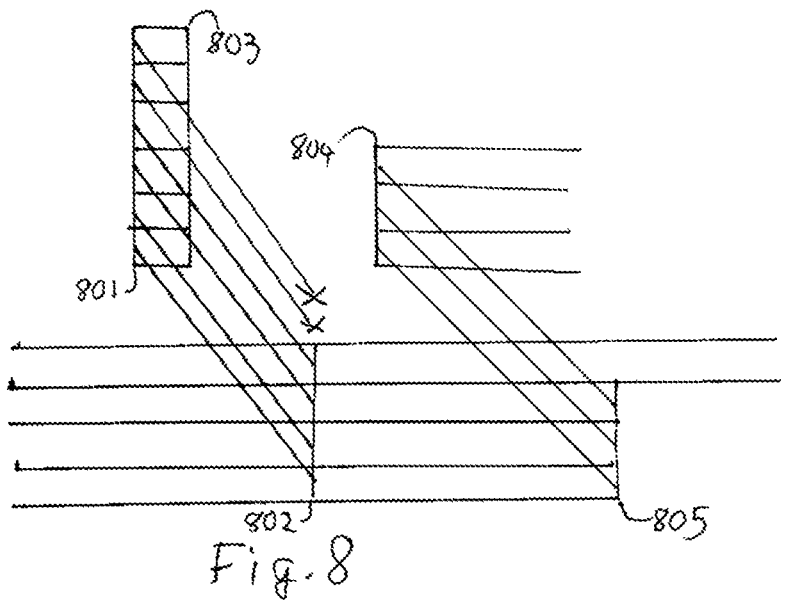
FIG. 8 shows a resource demand by an ISOS on the FRA, the first failing, the second successful.

FIG. 8 shows a resource demand by an ISOS on the FRA, the first failing, the second successful. The top shows a part of the ISOS resource ownership timeline, the bottom the corresponding part of the FRA resource ownership timeline. A typical resource would be writable memory. The finite limit on this resource is four units.

The ISOS requests six units 801, but the FRA can offer only four 802, and therefore the ISOS request is completely abandoned after a short time 803, and the FRA never yields ownership of any units. Later, the ISOS requests three units 804, and this time the FRA successfully grants them 805. After that point these three units are loaned to the ISOS and no longer appear as belonging to the FRA.

Figure 9:
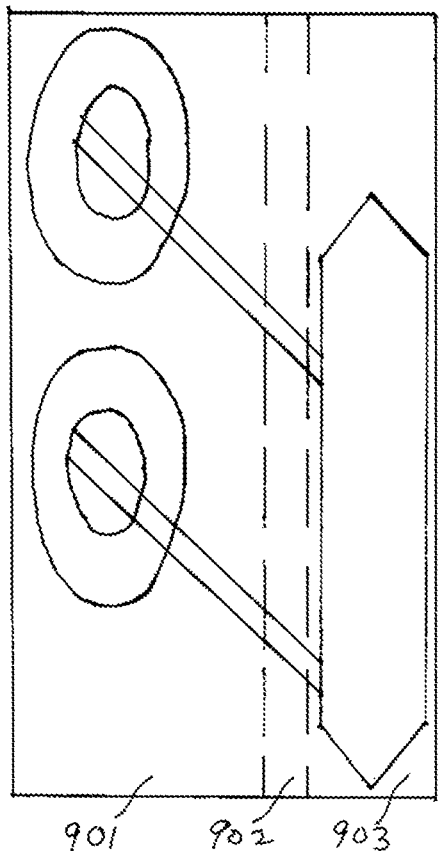
FIG. 9 shows the first embodiment, a FRA optimized for security.

FIG. 9 shows the first embodiment, a FRA optimized for security. To the left 901 are found resources that are under control of the ISOSs. Details are not shown, such as the subdivision of writable user resources into territories each exclusive to one of the ISOSs. To the center 902 are resources that are always under control of the FRA. They may be writable, but always by the FRA. Memory protection prevents writing by anything but the FRA. These resources may include code for the ISOS or its programs. To the right 903 are resources that are on chip or in ROM, and cannot be flashed or otherwise rewritten. These include all the FRA code.

Figure 10:
FIG. 10 shows the second embodiment, a FRA optimized for smoothness and other quality.
Figure 10:
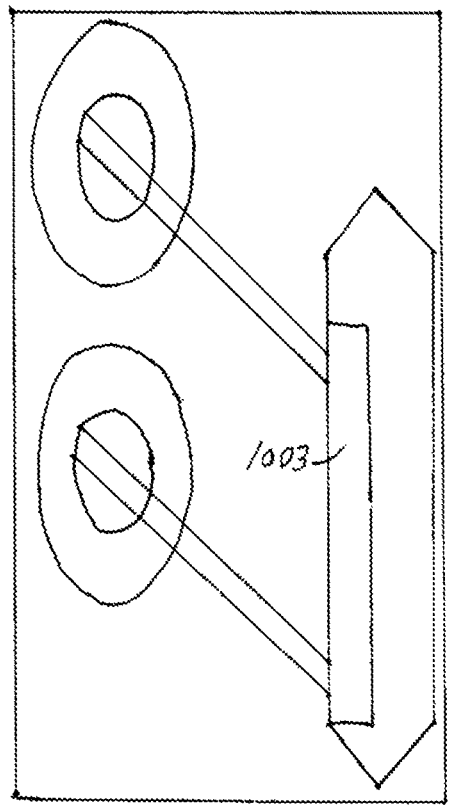

FIG. 10 shows the second embodiment, a FRA optimized for smoothness and other quality. Above to the left is a curve 1001 indicating the quality of output from OS-based code, suffering from jaggedness due to coarse response, to batching of operations in compiled code mediated by the OS, and to low-priority scheduling. Above to the right is a curve 1002 indicating the smoothness of which the CPU is capable if coded in a purely embedded fashion. Buffering code 1003 in the FRA is responsible to deliver this quality output, using a delay and the capabilities of deliberately crafted CSP-type code for getting embedded behavior, despite the poor quality of its input which is the virtual output of the ISOS.

FIG. 11 shows the third embodiment, communicating FRAs on several embedded platforms. The right platform is reflected for convenience of drawing. In addition to the standard capabilities of FIGS. 4 and 5, this embodiment has special bidirectional communicators 1101, 1102, 1103, which are directly controlled by the FRA and therefore are very responsive. (More complex arrangements are possible, and it is not required that all platforms be identical, or even be FRAISOS type.) Because of this very high responsiveness, the embedded system can do many characteristic low-latency operations like one "coded in DOS," but at the same time is able to be fully supported by modern OSs in the ISOS position, without these ISOSs ever causing a function-destroying "hiccup" in the embedded response.

FIG. 12 shows an instance of the third embodiment in the "hen and chicks" form, with a single FRAISOS platform called "master" controlling multiple FRA-only platforms called "servants" which in turn can robustly control sensors and actuators as for medical or robotic devices. The servants 1201 are connected to each other and to the master by bidirectional communicators 1202 so as to form a bidirectionally connected network. Sensors 1203 and actuators 1204 are connected to servants via sensor communicators 1205 and actuator communicators 1206 in various ways (master sensor and actuator communication not shown). In one example, the master has an ISOS that is a network OS. The master communicates with a servant through a subset of the master's resources, and hence still does not have any path to the outside world except through its FRA, even if the servants may fail to follow that rule. Every ISOS is still isolated from the outside world except via FRA permission or CSP communication with its FRA.

In the master-servant system, one or multiple paths of communication lead directly or indirectly from each servant to the master. If this instance of the third embodiment is designed for high reliability, these will include a path or paths that avoid any servant that has been marked unusable by other servants or the master. A path of communication is a sequence of nodes (masters or servants), with the communicating ones at the ends of the sequence, wherein every node in the sequence is connected to the next node in the sequence by a communicating link that can communicate data in the direction desired. In this system, the formal verification extends to cases of continued operation, communication, and control even where members of the network are destroyed according to certain specific patterns.

FIG. 13 shows an instance of the third embodiment in the cluster for high reliability form, with the multiple master collaborators of FIG. 11 to the left and various servant arrangements to the right. One servant 1301 is connected to all collaborators via bidirectional communicators 1302 and drives actuator 1303 by actuator communicators 1304. Other servants 1305 are distributed among the collaborators, connected each to one by bidirectional communicators 1306 and each with its own actuator 1307 and sensor 1308 communicating with it via actuator communicators 1309 and sensor communicators 1310. Other arrangements may easily be devised by those skilled in the art.

Embodiments of the present invention offer three advantages:

(1) Security can be based on the absolutely predictable behavior of the FRA, independently of whatever the ISOS may try to do.

(2) Efficiency (bandwidth and, even more, latency) can be determined by the bare-metal abilities of the FRA, and not hindered by complexity or multi-layer coding of the ISOS.

(3) Reliability can be assured by responsive and simply provable design of the FRA, including cases in which FRAs of multiple devices communicate to each other, and not be limited by software problems in ISOS or complex apps.

It will be apparent to those skilled in the art that various modification and variations can be made in the computer system and related method of the present invention without departing from the spirit or scope of the invention. Thus, it is intended that the present invention cover modifications and variations that come within the scope of the appended claims and their equivalents.

What is claimed is:

1. A device for running application programs, comprising:
one or more memories having instructions stored thereon;
one or more processors addressing the memories and configured to execute the instructions; and
a finite nonempty set of resources, each resource being a connection from one of the processors to an external device outside the memories and processors;
wherein the instructions include a finite resource allocator (FRA) which is a program of a first type and one or more intrinsically subordinate operating system (ISOS), each ISOS being a program of a second type which is configured to run one or more application programs on it, wherein the FRA and each ISOS are independent Communicating Sequential Processes (CSP) processes which communicate with each other only by strict CSP channel message passing without any buffering, interruptibility, or exceptions, wherein the FRA instructions are configured to always run at a high privilege, and each ISOS is configured to perform all of its substantive actions at a low privilege and without any substantive privilege change in its execution traces, and wherein only the FRA communicates with or controls any resources, and any ISOS communicates with any resource only indirectly through the FRA or by explicit permission of the FRA.

2. The device as claimed in claim 1, wherein the resources are an explicit finite list of resources known before execution of the programming begins.

3. The device as claimed in claim 1, wherein the instructions of the FRA are not rewritable, and the configuration of the resources is controlled by memory writable only by the FRA.

4. The device as claimed in claim 1, wherein each of the one or more ISOSs is an operating system on which application programs can run correctly using system calls that are restricted to use the resources only indirectly through the FRA or by permission of the FRA.

5. The device as claimed in claim 1, wherein a first instruction executed after power-on of the device is an instruction of the FRA, and bootup of every ISOS is under control of the FRA.

6. The device as claimed in claim 5, further comprising a memory from which booting is allowed to take place, wherein the FRA is stored on the memory, wherein the memory is one or more selected from a group consisting of: random access memory (RAM), read-only memory (ROM), SD (Secure Digital) Card, SIM (subscriber identity module) Card, USB (Universal Serial Bus) memory, DVD (digital video disc), Floppy Disk, hard drive or solid state drive.

7. The device as claimed in claim 1, wherein the FRA is executed at a predetermined time or position in a boot sequence.

8. The device as claimed in claim 1, wherein the FRA is formally verified using EDA (Electronic Design Automation) and CSP tools.

9. The device as claimed in claim 8, wherein the FRA is implemented in microelectronics selected from ROM chip, RAM chip, Programmable Logic Array, FPGA (field programmable gate array), ASIC (application specific integrated circuit), silicon die, semiconductor die, embedded devices, embedded processors and cores.

10. The device as claimed in claim 1, wherein the FRA is executed as high priority code according to real-time specifications.

11. The device as claimed in claim 1, wherein an ISOS provides services such as security services for one or more other ISOS.

12. The device of claim 1, wherein the external devices include digital inputs, digital outputs, sensors, actuators, or displays.

13. A system for embedded actuation, sensing and control or for high performance supercomputing comprising:
a master, the master being a device as claimed in claim 1; and
one or more servants, each servant comprising:
one or more memories having instructions stored thereon;
one or more processors addressing the memories and configured to execute the instructions; and
a finite nonempty set of resources, each resource being a connection from one of the processors to an external device outside the memories and processors;
wherein the instructions include a finite resource allocator (FRA) which is a program of a first type, wherein the FRA is a Communicating Sequential Processes (CSP) process,
wherein the master's resources include one or more communicating links to one of the servants, and every servant's resources include one or more communicating links to another servant or to the master, and all of the communicating links of the master and the servants collectively establish direct or indirect communication between every servant and the master, and wherein all communication over the communicating links is by strict CSP channel message passing without any buffering, interruptibility, or exceptions.

14. The system as claimed in claim 13, wherein multiple paths of communication lead directly or indirectly from each servant to the master, including a path or paths that avoid any different servant when said different servant has been marked unusable.

15. The system as claimed in claim 13, wherein the master has an ISOS that is a network OS.

16. A cluster for high reliability operation in destructive environments comprising:
more than one master collaborators, each master collaborator being a device as claimed in claim 1; and
zero or more servants, each servant comprising:
one or more memories having instructions stored thereon;
one or more processors addressing the memories and configured to execute the instructions; and
a finite nonempty set of resources, each resource being a connection from one of the processors to an external device outside the memories and processors;
wherein the instructions include a finite resource allocator (FRA) which is a program of a first type, wherein the FRA is a Communicating Sequential Processes (CSP) process,
wherein all the master collaborators and all the servants if any together form a network;
wherein the resources of every member of the network include one or more communicating links to at least one other member of the network, and all of the communicating links collectively establish direct or indirect communication between every member of the network and every other member of the network, and wherein all communication over the communicating links is by strict CSP channel message passing without any buffering, interruptibility, or exceptions.

17. The cluster as claimed in claim 16, wherein formally verifiable operation, communication and control survive after some members of the network have been destroyed according to specifically described patterns.

* * * * *